(12) United States Patent
Tobita et al.

(10) Patent No.: US 8,715,548 B2
(45) Date of Patent: May 6, 2014

(54) MOLD FASTENING DEVICE AND METHOD OF CONTROLLING THE MOLD FASTENING DEVICE

(75) Inventors: Hideaki Tobita, Mishima (JP); Harumichi Tokuyama, Odawara (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 1156 days.

(21) Appl. No.: 12/612,928

(22) Filed: Nov. 5, 2009

(65) Prior Publication Data

US 2010/0112113 A1    May 6, 2010

(30) Foreign Application Priority Data

Nov. 6, 2008  (JP) ................................ 2008-285659

(51) Int. Cl.
*B29C 45/80*  (2006.01)
(52) U.S. Cl.
USPC ........... 264/40.5; 425/150; 425/167; 425/593
(58) Field of Classification Search
USPC .............. 425/150, 167, 451.6, 593; 264/40.1, 264/40.5
See application file for complete search history.

(56) References Cited

U.S. PATENT DOCUMENTS

| | | | | |
|---|---|---|---|---|
| 5,180,530 | A * | 1/1993 | Cropper et al. | 425/150 |
| 5,238,383 | A | 8/1993 | Bannai | |
| 5,861,118 | A * | 1/1999 | Hokino et al. | 425/150 |
| 6,157,158 | A | 12/2000 | Ishikawa | |
| 7,244,379 | B2 | 7/2007 | Hakoda | |

FOREIGN PATENT DOCUMENTS

| | | |
|---|---|---|
| CN | 1640648 | 7/2005 |
| DE | 29502641 | 3/1995 |
| DE | 69908521 | 4/2004 |
| EP | 1 645 395 | 4/2006 |
| JP | 06-182836 | 7/1994 |
| JP | 09-076318 | 3/1997 |
| JP | 09-220747 | 8/1997 |
| JP | 2003-071895 | 3/2003 |
| JP | 2003-231162 | 8/2003 |
| JP | 2005-014366 | 1/2013 |

OTHER PUBLICATIONS

Japanese Office Action issued in JP 2008-285659 on Jan. 22, 2013.
English language Translation of Japanese Office Action issued in JP 2008-285659 on Jan. 22, 2013.
English Language Abstract of JP 2005-014366 published Jan. 20, 2005.
English Language Translation of JP 2005-014366 published Jan. 20, 2005.

(Continued)

*Primary Examiner* — James Mackey
(74) *Attorney, Agent, or Firm* — DLA Piper LLP (US)

(57) ABSTRACT

A mold fastening device has a fixed die plate, a rear plate, a movable die plate that can move back and forth, a toggle mechanism, and a drive motor that drives a cross-head. The position where the cross-head should be stopped is associated with the rate at which to accelerate the cross-head from that position or the rate at which to decelerate the cross-head to that position. The cross-head is operated at an acceleration that corresponds to that position. The drive motor is thereby driven at a constant output torque, regardless of the position of the movable die plate. Further, the time for opening and closing metal molds can be shortened.

5 Claims, 6 Drawing Sheets

(56) References Cited

OTHER PUBLICATIONS

English Language Abstract of JP 09-076318 published Mar. 25, 1997.
English Language Translation of JP 09-076318 published Mar. 25, 1997.
English Language Abstract of JP 2003-071895 published Mar. 12, 2003.
English Language Translation of JP 2003-071895 published Mar. 12, 2003.
English Language Abstract of JP 09-220747 published Aug. 26, 1997.
English Language Translation of JP 09-220747 published Aug. 26, 1997.
English Language Abstract of JP 06-182836 published Jul. 5, 1994.
English Language Translation of JP 06-182836 published Jul. 5, 1994.
Chinese Office Action issued in CN 200910220873.2 on Jul. 13, 2012.
English Translation of Chinese Office Action issued in CN 200910220873.2 on Jul. 13, 2012.
English Language Abstract of CN 1640648 published on Jul. 20, 2005.
German Office Action issued in DE 10 2009 052 082 on Jan. 19, 2011.
English Language Translation of German Office Action issued in DE 10 2009 052 082 on Jan. 19, 2011.
English Language Abstract of DE 69908521 Published Apr. 29, 2004.
English Language Abstract of JP 2003-231162, published Aug. 19, 2003.
Machine English Language Translation of JP 2003-231162, published Aug. 19, 2003.

\* cited by examiner

MOLD FASTENING DEVICE AND METHOD OF CONTROLLING THE MOLD FASTENING DEVICE

CROSS-REFERENCE TO RELATED APPLICATIONS

This application is based upon and claims the benefit of priority from prior Japanese Patent Application No. 2008-285659, filed Nov. 6, 2008, the entire contents of which are incorporated herein by reference.

BACKGROUND OF THE INVENTION

1. Field of the Invention

The present invention relates to a mold fastening device in which metal molds can be opened and closed within a short time, and to a method of controlling the drive motor in the mold fastening device.

2. Description of the Related Art

A mold fastening device is available, in which a toggle mechanism is provided between the rear plate and movable die plate, and an electric motor drives the toggle mechanism, thereby moving the movable die plate and locking the metal molds. In this mold fastening device, the rotational speed of the electric motor is controlled, moving the movable die plate holding the movable metal mold, thereby closing the metal molds. The movable die plate, for example, is accelerated. When the acceleration reaches a prescribed value, the movable die plate is then moved at a constant speed. When the movable die plate arrives at a prescribed position, it is decelerated and stopped at a desired position. Thereafter, the toggle mechanism is further driven to lock the metal molds with a predetermined fastening force. Jpn. Pat. Appln. KOKAI Publication 2003-231162

The distance the movable die plate should move is determined by the size of the molding to produce. The ranges in which the links of the toggle mechanism are moved in predetermined ranges, too. However, the rotational speed of the drive motor is increased or decreased at a certain rate, regardless of the position where the movable die plate stops, opening the metal molds. That is, since the distance the movable die plate moves changes in accordance with the coupling (angle) state of the links, the position at which the movable die plate starts moving changes even if the rotational speed of the drive motor is increased or decreased at a constant rate. Therefore, the movable die plate is accelerated or decelerated at different rates, depending upon the positions where it is located.

This means that the drive motor operates in a region falling outside its maximum torque, and that the movable die plate is accelerated or decelerated at a rate lower than the maximum acceleration or deceleration rate. Hence, the ability the drive motor has is not effectively utilized, inevitably lengthening the time for opening and closing the metal molds.

This invention has been made to solve the problems described above. An object of the invention is to provide a mold fastening device and a method of controlling the drive motor of the device, which can effectively use the maximum torque of the drive motor and can shorten the time for opening and closing metal molds.

BRIEF SUMMARY OF THE INVENTION

To achieve this object, a mold fastening device and a method of controlling the drive motor of the device are designed as follows.

The mold fastening device comprises a fixed die plate to which a fixed metal mold is secured; a rear plate coupled to the fixed die plate by tie bars; and a movable die plate to which a movable metal mold is secured, which is movably provided between the rear plate and fixed die plate.

The device further comprises a toggle mechanism and a drive motor. The toggle mechanism is provided between the rear plate and movable die plate, and is and configured to move the movable die plate back and forth and to lock the fixed metal mold and movable metal mold. The drive motor is coupled to the cross-head of the toggle mechanism, and drives the cross-head.

The mold fastening device can be operated in two modes. In the first mode, the position where the cross-head should be stopped is associated with the rate at which to accelerate the cross-head from that position, and the cross-head is operated at an acceleration that corresponds to that position, thereby driving the drive motor at a constant output torque, regardless of the position of the movable die plate, while the movable die plate is being accelerated.

In the second mode, the position where the cross-head should be stopped is associated with the rate at which to decelerate the cross-head from that position, and the cross-head is operated at a deceleration that corresponds to that position, thereby driving the drive motor at a constant output torque, regardless of the position of the movable die plate, while the movable die plate 26 is being decelerated. The device may be operated in one mode only or in both modes.

In the method of controlling the drive motor of the device, in order to accelerate or decelerate the movable die plate, the position of the cross-head is detected, a rate of increase or decrease for the drive motor is read in accordance with the detected position of the cross-head, the drive motor is driven in accordance with the rate of increase or decrease read, and the drive motor is then driven at a constant torque, regardless of the position of the movable die plate.

In the mold fastening device and method of controlling the drive motor of the device, both according to this invention, the rate of increase or decrease of rotational speed of the drive motor is changed in accordance with the coupling state of the links of the toggle mechanism, i.e., the position of the cross-head. The output torque of the drive motor is therefore constant. Hence, the ability the drive motor can be effectively utilized, which enhances the operating efficiency of the mold fastening device.

The movable die plate is accelerated or decelerated, always at a constant rate, regardless of its position. That is, neither the acceleration nor deceleration is prevented from lowering. This can shorten the time for opening and closing metal molds.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 7:
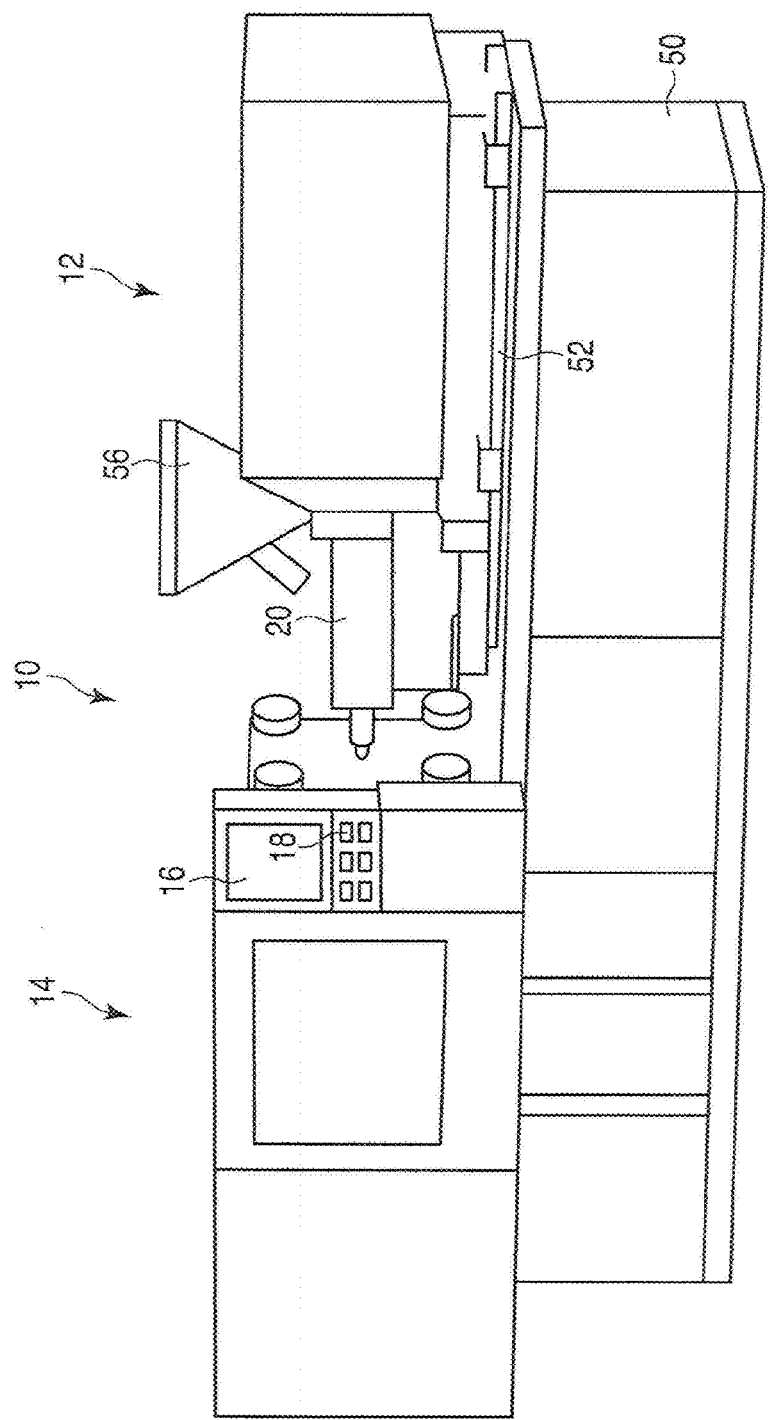
FIG. 7 is a perspective view of an injection molding apparatus.

An embodiment of a mold fastening device according to this invention will be described with the accompanying drawings. FIG. 7 shows an injection molding apparatus 10 that has a mold fastening device 19.

The injection molding apparatus 10 comprises a base 50, an injection device 12, and a mold fastening device 19. The injection molding apparatus 10 has a display means 16 and an input means 18, both arranged on an almost center part of the apparatus 10.

The base 50 is almost a rectangular solid. Rails 52 are laid on the upper surface of the base 50. The rails 52 extend in the lengthwise direction of the base 50. The injection device 12 is mounted on the rails 52 and can move freely.

The injection device 12 comprises a cylinder 20, a drive mechanism (not shown), and a hopper 56. The cylinder 20 holds a screw in it. The drive mechanism can rotate the screw around its axis and move the screw back and forth in the axial direction. In the injection device 12, the drive mechanism drives the screw forward, injecting resin from the cylinder 20 into the cavity of a metal mold 36, which will be described later.

The mold fastening device 14, which holds the metal mold 36, is mounted on the left part of the base 50, opposing the injection device 12. The injection device 12 and mold fastening device 14 have a cover provided outside. FIG. 7 shows the devices 12 and mold fastening device 14, either covered with a cover.

Figure 1:
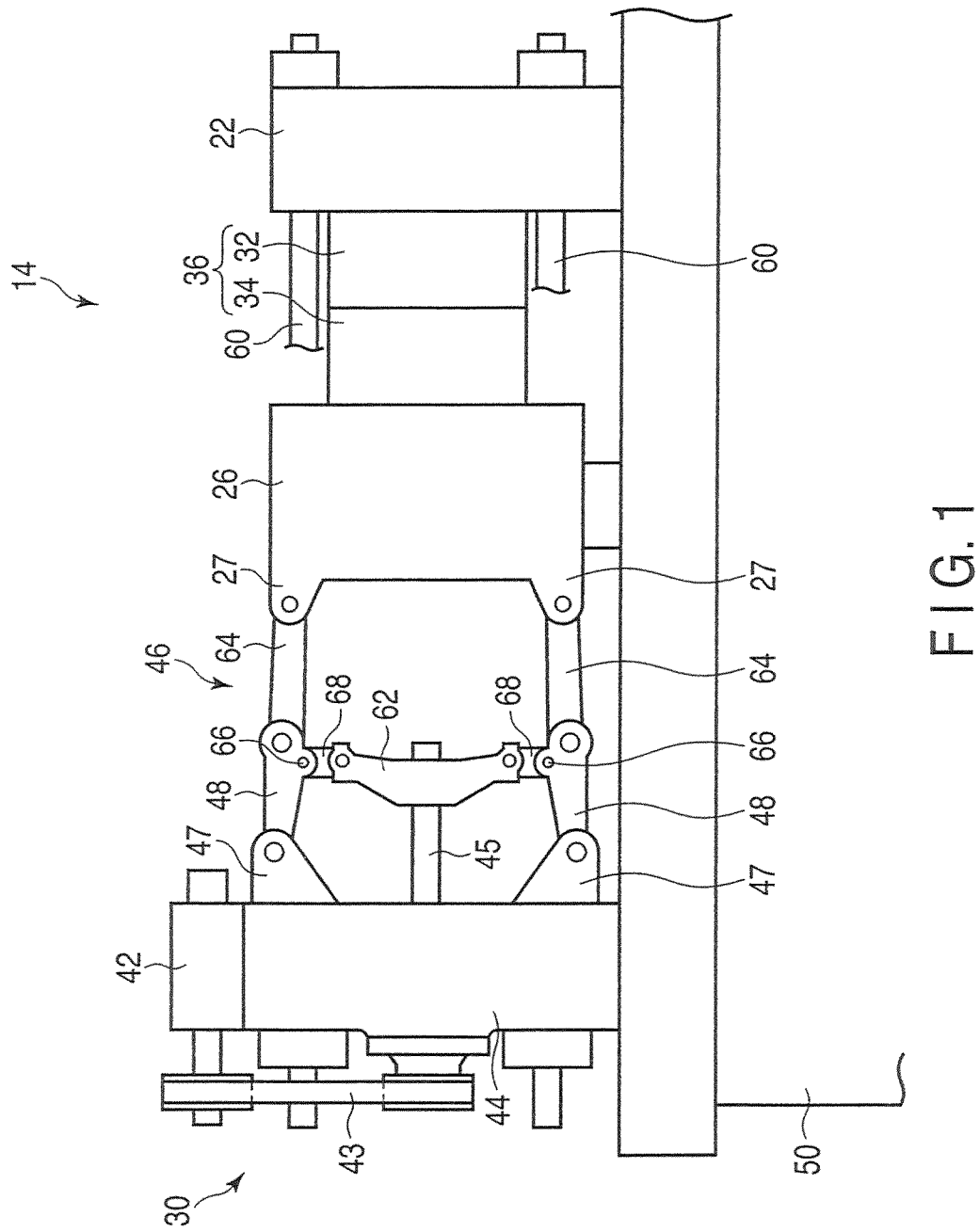
FIG. 1 is a side view of an embodiment of a mold fastening device according to this invention.

FIG. 1 shows the mold fastening device 14. The mold fastening device 14 comprises a fixed die plate 22, a fixed-mold holding base 24, a movable die plate 26, and a drive mechanism 30. The mold fastening device 14 will be described, assuming that its front faces the injection device 12. Based on this assumption, the back, left side and right side of the device 14 are defined. Further, the top and bottom of the mold fastening device 14 are defined in accordance with the direction of gravity.

The drive mechanism 30 comprises a drive motor 42, a rear plate 44, a toggle mechanism 46, and tie bars 60. The drive motor 42 is attached to the rear plate 44. A transmission belt 43 is wound around the drive shaft of the drive motor 42 and screw shaft 45 of a ball screw mechanism. Thus, the transmission belt 43 couples the drive motor 42 to the screw shaft 45 of the ball screw mechanism.

The rear plate 44 is movably mounted on the base 50 and arranged at the position determined by the thickness of the metal mold 36. The tie bars 60 are secured, at one end, to the rear plate 44. The drive mechanism 30 has four tie bars 60, which are secured to the four corners of the rear plate 44, respectively. The tie bars 60 extend forward and are secured, at the other end, to the four corners of the fixed die plate 22, respectively.

The fixed die plate 22 is held on the base 50 at a prescribed position. A fixed metal mold 32 is fastened to the back of the fixed die plate 22.

The movable die plate 26 is arranged between the fixed die plate 22 and rear plate 44 and can move back and forth. The movable die plate 26 has four guide holes (not shown) in its four corners, respectively. The tie bars 60 slidably extend through the guide holes. On the front of the movable die plate 26, a movable metal mold 34 is secured. On the back of the movable die plate 26, support parts 27 are provided. Toggle arms 64, which will be described later, are coupled to the support parts 27, respectively.

The toggle mechanism 46 comprises toggle levers 48, a cross-head 62, and toggle arms 64. The toggle levers 48 are rotatably coupled, at one end, to the support parts 47 of the rear plate 44. The mechanism 46 has two pairs of toggle levers 48, i.e., an upper pair and a lower pair.

The cross-head 62 has, at the center part, the nut part (not shown) of the ball screw mechanism. Two connecting strips 68 are coupled, at one end, to the upper and lower ends of the cross-head 62, respectively. The nut part is set in screw engagement with the screw shaft 45 of the ball screw mechanism. As the screw shaft 45 rotates, the nut part moves back and forth, driving the cross-head 62 back and forth. The nut part may be provided on the rear plate 44. The connecting strips 68 are coupled, at the other end, to the toggle levers 48 with coupling pins 66.

The toggle arms 64 are coupled, at one end, to the toggle levers 48 and can rotate freely. At other end, the toggle arms 64 are coupled to the support parts 27 of the movable die plate 26 and can rotate freely. Like the toggle levers 48, two pairs of toggle arms 64 are provided, i.e., an upper pair and a lower pair.

The drive motor 42 will be described below.

Figure 4:
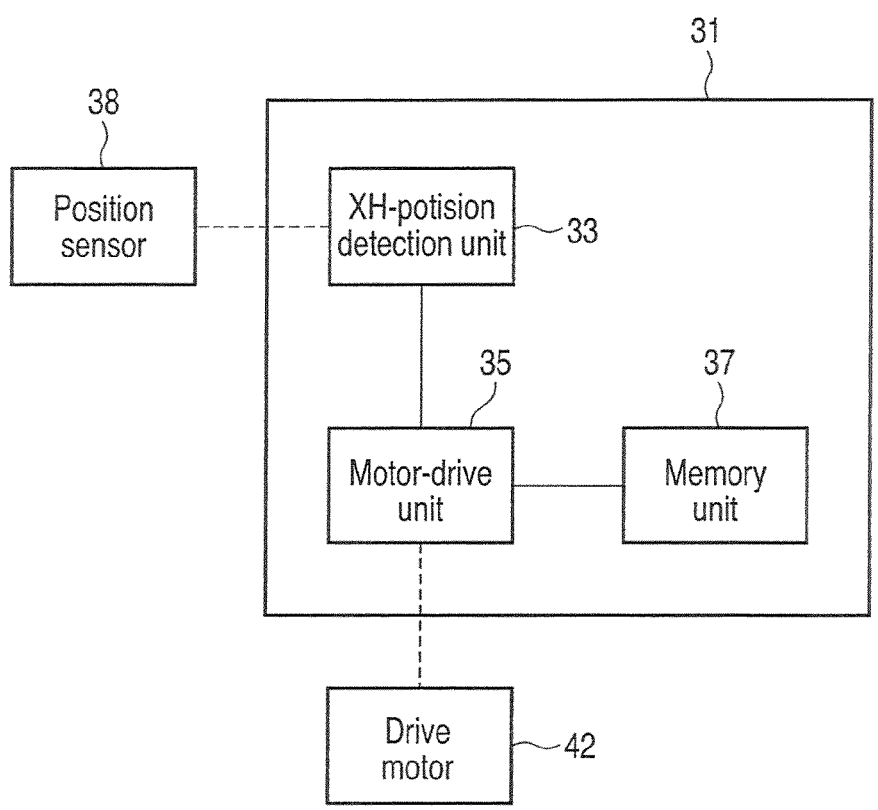
FIG. 4 is a block diagram showing the control unit of the mold fastening device.

The drive motor 42 is an electric motor. The rotational speed of its drive shaft can be set to any desired value. Further, its rotational angle can be detected by a sensor (not shown). The drive motor 42 is controlled by a control unit 31, which is shown in FIG. 4. The control unit 31 comprises an XH-position detection unit 33, a motor-drive unit 35, and a memory unit 37.

The XH-position detection unit 33 is connected to a position sensor 38 provided on the cross-head 62 (designated as XH in the drawings). The XH-position detection unit 33 detects the position of the cross-head 62 from a signal supplied from the position sensor 38. On receiving the position data about the cross-head 62 from the XH-position detection unit 33, the motor-drive unit 35 reads the rate of increase or decrease of rotational speed of the drive motor 42 from the memory unit 37. Then, the motor-drive unit 35 increases or decreases the rotational speed of the drive motor 42 in accordance with the rate of increase or decrease read from the memory unit 37.

The memory unit 37 stores various rates of increase and decrease of rotational speed, which correspond to the various positions the cross-head 62 may take. The rates of increase and decrease are such that the movable die plate 26 is accelerated or decelerated at almost the same value, regardless of its position, when the cross-head 62 is driven at any rate of increase or decrease. Hence, the drive motor 42 is driven at the same torque at all times. The memory unit 37 need not store all rates of increase and decrease for the entire distance the cross-head 62 may move. Rather, it may store the rates of increase and decrease for only a part of that distance. In this case, the rates of increase and decrease for the other parts of the distance are interpolated by calculation.

Figure 3:
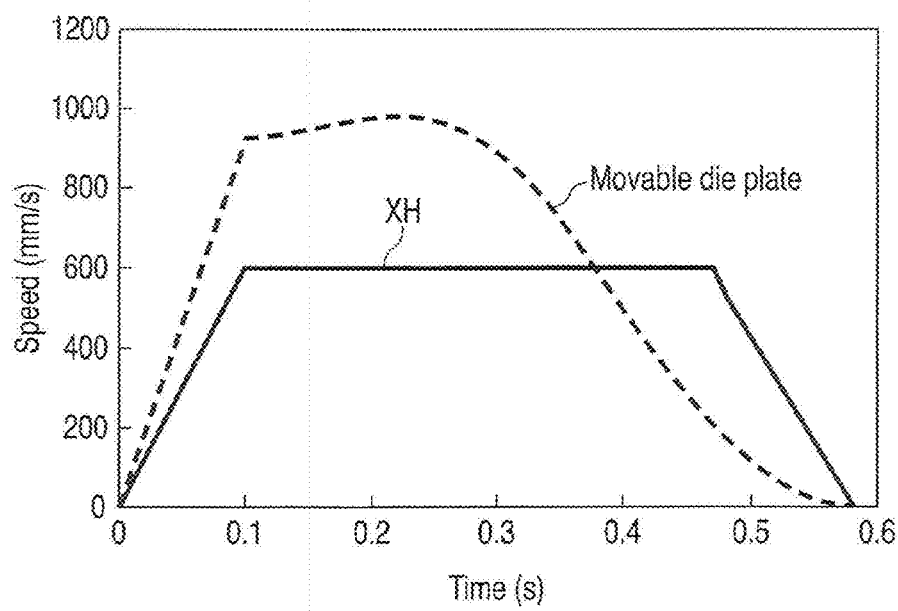
FIG. 3 is a graph showing how the speeds of the cross-head and movable die plate change in the mold fastening device.

This point will be explained in greater detail. FIG. 3 is a graph representing the relationship between the speed change of the cross-head 62 and that of the movable die plate 26. FIG. 3 is based on the assumption that the cross-head 62 and movable die plate 26 are moved to close the metal molds. That is, the metal plates are fully opened at time 0, and are completely closed 0.6 seconds later when the cross-head 62 and movable die plate 26 are stopped. The cross-head 62 is accelerated at a constant rate until 0.1 seconds has elapsed after the start of motion. The final speed of the cross-head 62 is 600 mm/s. The cross-head keeps moving at this speed, is decelerated about 0.47 seconds later, and stops about 0.57 seconds after the start of motion.

The broken-line curve shown in FIG. 3 shows how the speed of the movable die plate 26 changes when the cross-head 62 is accelerated at the above-mentioned rate. The change in the speed of the movable die plate 26 differs from the change in the speed of the cross-head 62, because the movable die plate 26 is driven by the toggle mechanism 45. That is, the speed of the movable die plate 26 depends on the position where the cross-head 62 starts moving. Hence, if the cross-head 62 is accelerated at the same rate by the drive motor 42, the speed of the movable die plate 26 will change in a different way in accordance with the position where the movable die plate 26 starts moving or with the position where the movable die plate 26 stops moving, that is, in accordance with the coupling state of the links of the toggle mechanism 46.

Figure 2:
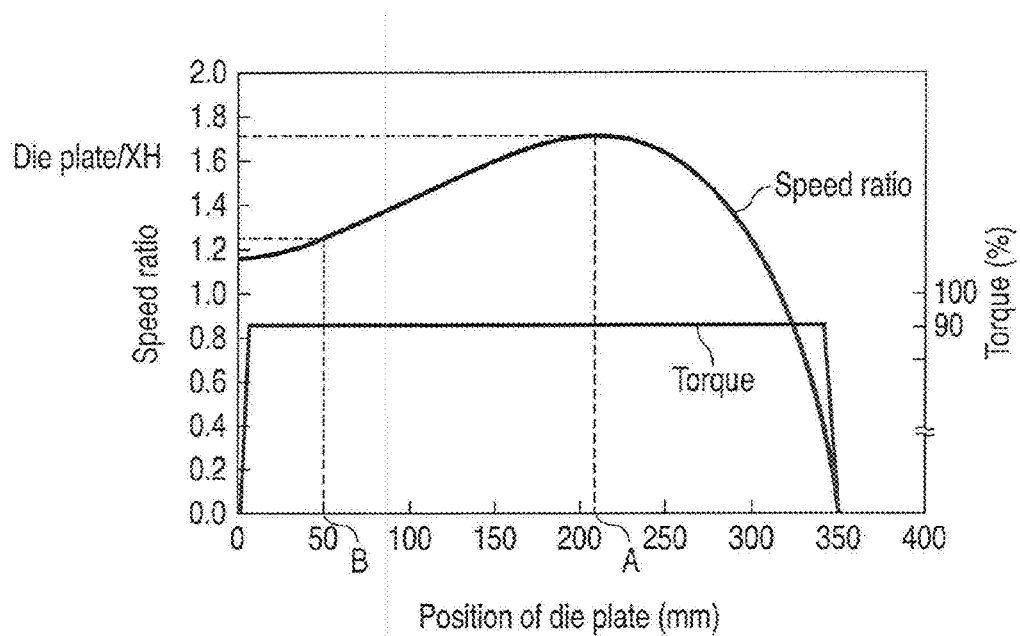
FIG. 2 is a graph showing the relationship between the speed ratio and position of the movable die plate of the mold fastening device.

FIG. 2 is a graph showing the speed ratio of the movable die plate 26 to the cross-head 62, and the torque of the drive motor 42. In this graph, the position of the movable die plate 26 is plotted on the abscissa. The origin (0) indicates the position the plate 26 takes when the toggle mechanism 46 is most contracted. As the movable die plate 26 moves forward, the point corresponding to the speed ratio moves to the right on the abscissa. Plotted on the left ordinate is the speed ratio of the movable die plate 26 to the cross-head 62. Plotted on the right ordinate is the output torque of the drive motor 42. The speed ratio is a value that is uniquely obtained from the link structure of the toggle mechanism 46.

As seen from the graph of FIG. 2, the toggle mechanism 46 is so designed that the speed ratio of the movable die plate 26 to the cross-head 62 is largest when the movable die plate 26 is at a distance of about 210 mm.

The rate of increase or decrease of rotational speed of the drive motor 42 is calculated as follows. First, the acceleration or deceleration of the movable die plate 26 (including the movable metal mold 34) is detected when the movable die plate 26 is passing position A as the drive motor 42 is drive at a desired torque (e.g., the maximum torque or the torque achieving the highest operating efficiency). Then, the rate of increase or decrease of rotational speed of the drive motor 42 which achieves that acceleration detected is multiplied by the reciprocal of the speed ratio of the movable die plate 26 at each position. The resultant product is used as the rate of increase or decrease of rotational speed of the drive motor 42.

The memory unit 37 stores various rates of increase and decrease of rotational speed of the drive motor 42, which correspond to the various positions the cross-head 62 may take. When the motor-drive unit 35 receives the data representing the position of the cross-head 62, which the motor-drive unit 35 has detected, it reads from the memory unit 37 the rate of increase or decrease of rotational speed at which the drive motor 42 should be driven when the cross-head 62 is at that position. The drive motor 42 is driven at the rate of increase or decrease of rotational speed.

How the mold fastening device 14 operates will be explained.

Figure 5:
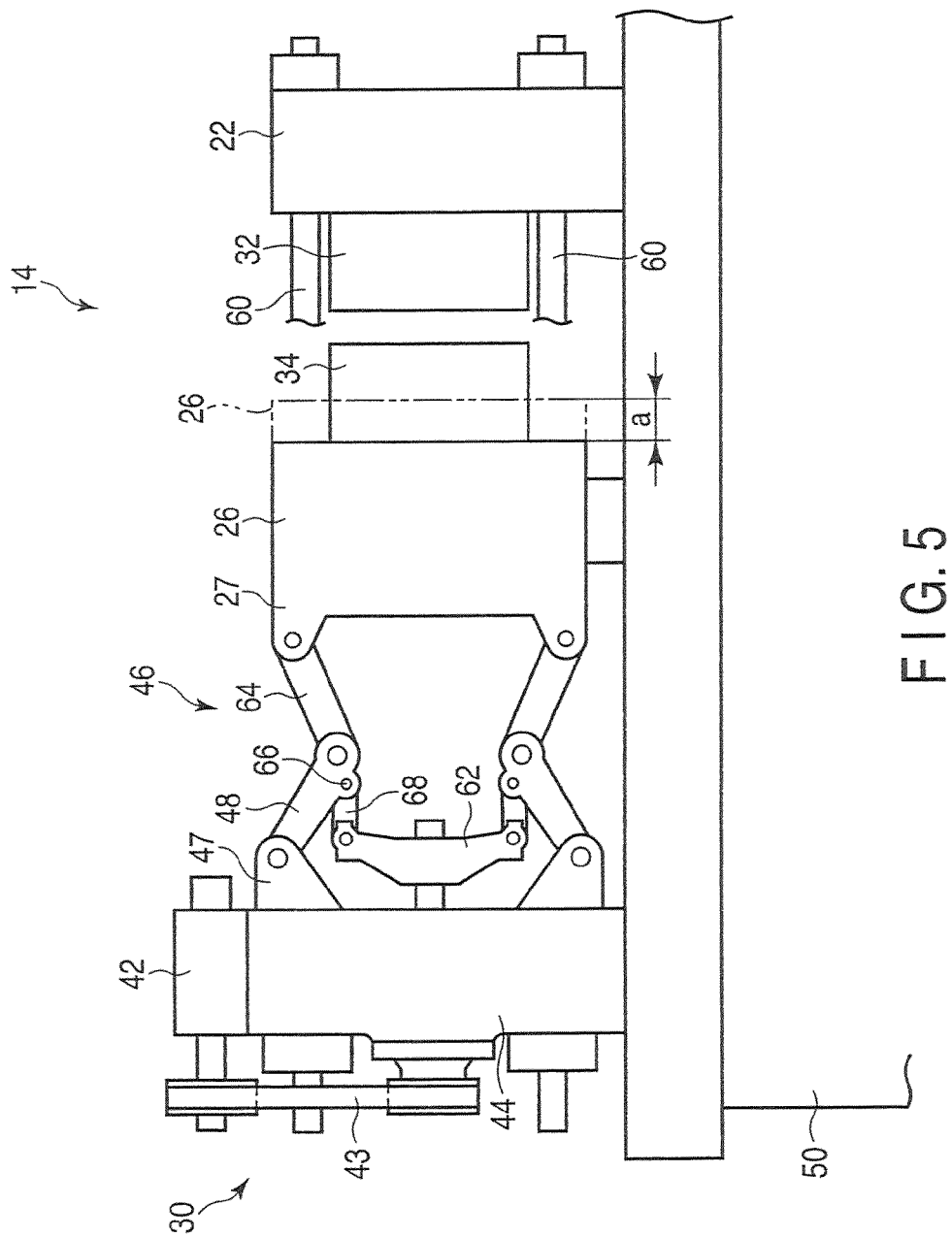
FIG. 5 is another side view of the mold fastening device.

FIG. 5 is a side view of the mold fastening device 14, showing the metal mold 36 opened. The toggle mechanism 46 is pulled back to the left. The toggle levers 48 therefore pull the toggle arms 64 to the left. The movable die plate 26 is moved to the left by distance a. Thus, the metal mold 36 is opened, with the movable metal mold 34 spaced from the fixed metal mold 32 by distance a.

Assume that distance a is about 140 mm. Then, in the state of FIG. 5, the movable die plate 26 is located at point A shown in FIG. 2. To fasten the movable metal mold 34 to the fixed metal mold 32 in this state, the position sensor 38 supplies the position data to the XH-position detection unit 33. The data representing the position of the cross-head 61 (210 mm) is input to the motor-drive unit 35. The motor-drive unit 35 reads, from the memory unit 37, the rate of increase or decrease of rotational speed at which the drive motor 42 should be driven when the cross-head 62 is at the distance of 210 mm. The drive motor 42 is driven at the rate of increase of rotational speed read from the memory unit 37. As a result, the drive motor 42 thus driven at the increased rotational speed accelerates the cross-head 62, whereby the movable die plate 26 is accelerated at the desired rate. That is, the drive motor 42 drives the movable die plate 26 at the preset output torque (e.g., maximum torque).

Figure 6:
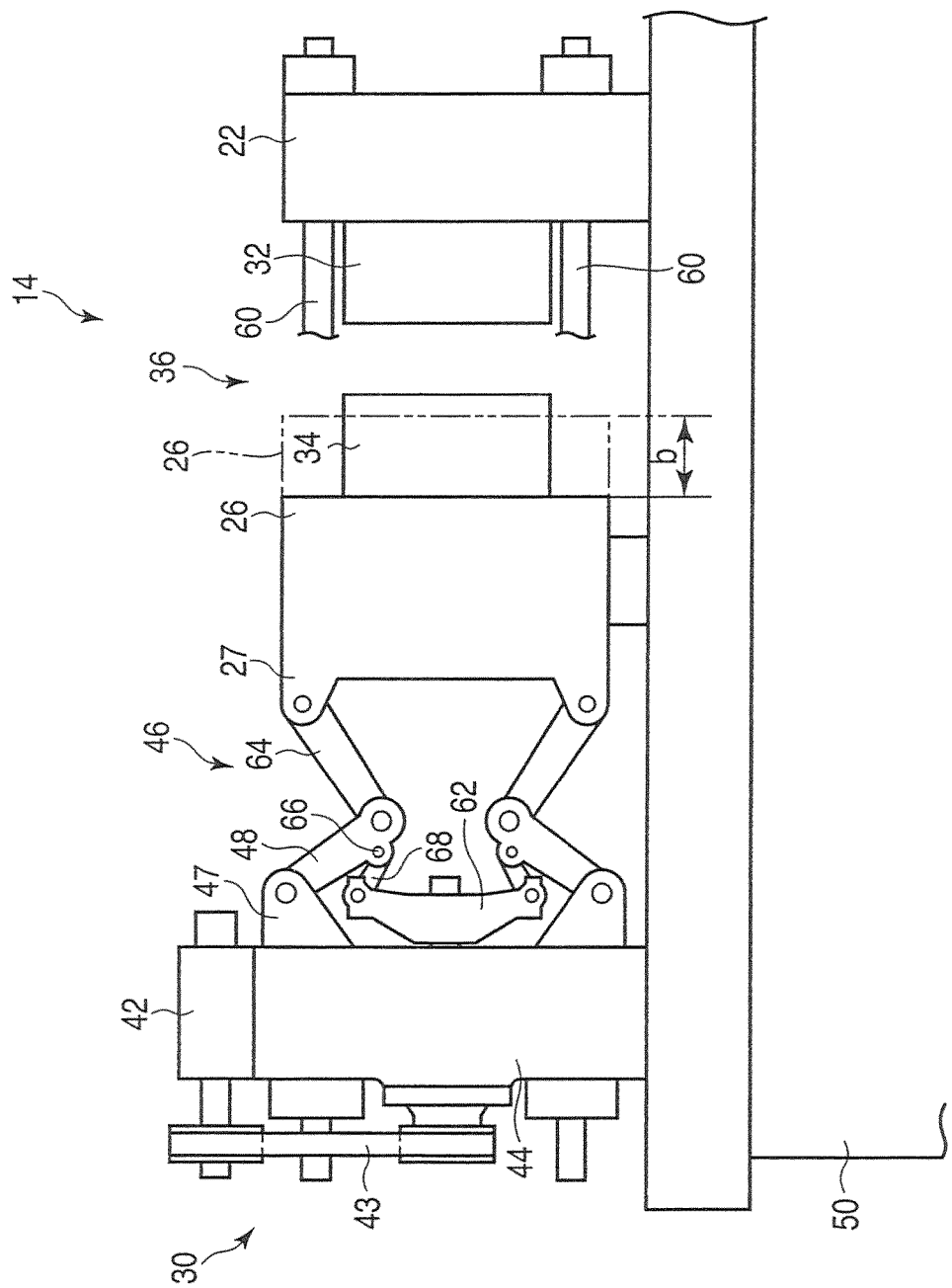
FIG. 6 is still another side view of the mold fastening device.

Assume that the movable die plate 26 is moved to the left by distance b as shown in FIG. 6. Further assume that distance b is 300 mm, and that the movable metal mold 34 is fastened to the fixed metal mold 32 in this state. Then, the movable die plate 26 is at position B shown in FIG. 2, or at a distance of 50 mm. In this case, the motor-drive unit 35 reads, from the memory unit 37, the rate of increase or decrease of rotational speed at which the drive motor 42 should be driven when the cross-head 62 is at the distance of 50 mm. The rate of increase or decrease of rotational speed is the value obtained by multiplying the acceleration detected at position A by the reciprocal of the speed ratio. That is, this rate is about 1.40 times the rate of increase or decrease at point A, or 1.7×1/1.21. In other words, this rate is about 1.40 times the rate of increase or decrease of rotational speed at point A.

If the rotational speed of the drive motor 42 is increased at the rate of 1.4 times the rate of increase of rotational speed at point A, at the distance of 50 mm, the movable die plate 26 can be accelerated in the same condition as at point A. Ultimately, the drive motor 42 can be driven at a desirable torque. The rate of increase of rotational speed should preferably be changed in accordance with the speed ratio, because the speed ratio changes thereafter.

In order to stop the movable die plate 26 at point A or B, the rotational speed of the drive motor 42 is decreased at a rate that corresponds to the speed ratio for point A or B. As a result, the movable die plate 26 can be decelerated at an almost constant rate, irrespective of the position at which to stop the movable die plate 26. FIG. 2 shows a torque curve, which shows how the torque of the drive motor 42 changes as the movable die plate 26 is moved. As seen from the torque curve, the torque remains almost constant, regardless of the position of the movable die plate 26. Since the toggle mechanism 46 has a constant speed ratio, the movable die plate 26 can be decelerated at the lock side, in the same way as the toggle mechanism 46, regardless of the position where it has started moving.

As has been described, the control unit 31 changes the rate of increase or decrease of rotational speed of the drive motor 42 in accordance with the position of the cross-head 62, i.e., the position of the movable die plate 26. The movable die plate 26 is therefore accelerated or decelerated at a constant rate, irrespective of the position of the movable die plate 26. That is, the rate of increase or decrease of rotational speed of the drive motor 42 is not increased so much if the movable die plate 26 moves more than the cross-head 62, and is greatly increased if the movable die plate 26 moves less than the cross-head 62. The movable die plate 26 can thereby be driven at an almost constant speed.

Thus, the movable die plate 26 can operate at a desirable torque such as the most efficient or maximum torque of the drive motor 42. Hence, the mold fastening device 14 can stably operate at high efficiency, not driving the motor 42 in an overloaded state. Since the movable die plate 26 can be accelerated and decelerated at a constant rate, it is never accelerated at an excessively low rate. This can further shorten the opening and closing time of the metal mold 36.

The movable die plate 26 need not always be moved at a constant speed. It may undergo a speed change only if the drive motor 42 keeps operating at the maximum torque or the desirable torque. In the embodiment described above, the toggle mechanism 46 has two pairs of toggle arms 64 are provided, i.e., an upper pair and a lower pair. The toggle mechanism is not limited to this configuration, nonetheless, in the present invention.

What is claimed is:

1. A mold fastening device comprising:
   a fixed die plate to which a fixed metal mold is secured;
   a rear plate coupled to the fixed die plate by tie bars;
   a movable die plate to which a movable metal mold is secured, which is movably provided between the rear plate and fixed die plate;
   a toggle mechanism comprising a cross-head, the toggle mechanism provided between the rear plate and movable die plate and configured to move the movable die plate back and forth among a plurality of positions and to lock the fixed metal mold and movable metal mold; and
   a drive motor coupled to the cross-head of the toggle mechanism, configured to drive the cross-head, and configured to, at each position of the moveable die plate, be controlled to have a rate of increase or decrease of rotational speed corresponding to the position of the moveable die plate, the rate corresponding to each position being determined by multiplying a rate of increase or decrease of rotational speed at each position of the moveable die plate for a desired torque by a reciprocal of a ratio of a speed of the moveable die plate to a speed of the cross-head;
   wherein:
      a stopping position where the cross-head should be stopped is associated with at least one of the rate at which to accelerate the cross-head from the stopping position and that at which to decelerate the cross-head to the stopping position, and
      the cross-head is operated at an acceleration or deceleration that corresponds to the stopping position, thereby driving the drive motor at a constant output torque, regardless of the position of the movable die plate, while the lovable die plate is being accelerated or decelerated.

2. The mold fastening device according to claim 1, wherein a constant output torque of the drive motor has one value to accelerate the movable die plate and another value to decelerate the movable die plate.

3. The mold fastening device according to claim 1 or 2, wherein the output torque of the drive motor is the maximum torque the drive motor can attain, or a torque 90% or more of the maximum torque.

4. A control device for use in a mold fastening device comprising a fixed die plate to which a fixed metal mold is secured; a rear plate coupled to the fixed die plate by tie bars; a movable die plate to which a movable metal mold is secured, which is movably provided between the rear plate and fixed die plate; a toggle mechanism comprising a cross-head, the toggle mechanism provided between the rear plate and movable die plate and configured to move the movable die plate back and forth among a plurality of positions and to lock the fixed metal mold and movable metal mold; and a drive motor coupled to the cross-head of the toggle mechanism and configured to drive the cross-head, the control device comprising:
   a position detection unit configured to detect the position of the cross-head;
   a memory unit configured to store rates of increase and decrease of rotational speed of the drive motor, the rates corresponding to the positions the cross-head may have; and
   a motor-drive unit configured to, at each position of the moveable die plate, read from the memory unit a rate of increase or decrease for the drive motor in accordance with the position of the cross-head that the position detection unit has detected, drive the drive motor to have the rate of increase or decrease of rotational speed corresponding to the detected position, the rate corresponding to each position being determined by multiplying a rate of increase or decrease of rotational speed at each position of the moveable die plate for a desired torque by a reciprocal of a ratio of a speed of the moveable die plate to a speed of the cross-head;
   wherein the cross-head is operated at an acceleration or deceleration corresponding to the position of the cross-head, thereby driving the drive motor at a constant output torque, regardless of the position of the movable die plate, while the movable die plate is being accelerated or decelerated.

5. A method of controlling a drive motor in a mold fastening device comprising a fixed die plate to which a fixed metal mold is secured; a rear plate coupled to the fixed die plate by tie bars; a movable die plate to which a movable metal mold is secured, which is movably provided between the rear plate and fixed die plate; a toggle mechanism comprising a cross-head, the toggle mechanism provided between the rear plate and movable die plate and configured to move the movable die plate back and forth and to lock the fixed metal mold and movable metal mold; a memory unit configured to store rates of increase and decrease of rotational speed of the drive motor, the rates corresponding to the positions the cross-head may have; and a drive motor coupled to the cross-head of the toggle mechanism and configured to drive the cross-head, the method comprising:
   detecting a position of the cross-head;
   reading a rate of increase or decrease for the drive motor from the memory unit in accordance with the detected position of the cross-head, the rate of increase or decrease of rotational speed corresponding to the position of the moveable die plate, the rate corresponding to each position being determined by multiplying a rate of increase or decrease of rotational speed at each position of the moveable die plate for a desired torque by a reciprocal of a ratio of a speed of the moveable die plate to a speed of the cross-head;
   driving the drive motor in accordance with the rate of increase or decrease of rotational speed at each position of the moveable die plate.

\* \* \* \* \*